May 27, 1958 G. VARLONGA 2,836,449
CLAMPING ARRANGEMENT
Filed April 14, 1954

INVENTOR.
Giovanni Varlonga
BY
Michael S. Striker
Attorney

United States Patent Office

2,836,449
Patented May 27, 1958

2,836,449

CLAMPING ARRANGEMENT

Giovanni Varlonga, Milan, Italy, assignor to
F. E. A. L. Societa, Milan, Italy

Application April 14, 1954, Serial No. 423,179

Claims priority, application Italy April 24, 1953

4 Claims. (Cl. 287—54)

This invention relates to a joint, particularly suitable for the joining of uprights and frame elements of shelves, pieces of furniture and the like, and that allows to obtain shelves, pieces of furniture or the like which can be easily and readily assembled and disassembled.

By having recourse to such a joint, a rather safe and reliable joining of uprights and frame elements can be obtained, without the necessity of further fastening components, as screws, bolts or the like.

The joint according to the invention consists substantially of two joint halves or jaw members, which can be connected to one another by means of a bolt, thus forming a split sleeve that can be tightly fitted around the tubular uprights, and of two arms designed to slide along a suitable guide formed on the frame element. Said split sleeve does not extend itself on the whole periphery of tubular upright, whereby both halves can be pivoted thereon, parallely to a plane perpendicular to upright axis; such a feature can be utilized to obtain a given spreading apart of the arms while fitted in the frame element guide, when tightening the bolt by which the joint halves are connected to one another. In other words, by tightening said bolt, the rear edges of joint halves are drawn nearer, while the opposite edges thereof, together with their arms, are spread apart. Accordingly, said arms, in their slanting position thus attained, will be forced against the guide bottom on one side, and against suitable shoulders formed on the guide edges on the opposite side, thereby giving a safe and reliable fastening of both components.

The aforedescribed type of joint allows a series manufacturing of shelves and pieces of furniture of the most different type, as to such a purpose it will be sufficient to cut the series manufactured, standard lengths of uprights and frame elements, into the required length.

The frame elements can act also as supports for the shelf planks, and the joints can be utilized for the joining either of intermediate uprights and frame elements, or of end uprights and frame elements.

A preferred embodiment form of the invention is shown in the accompanying drawing. In same drawing.

Figure 1:
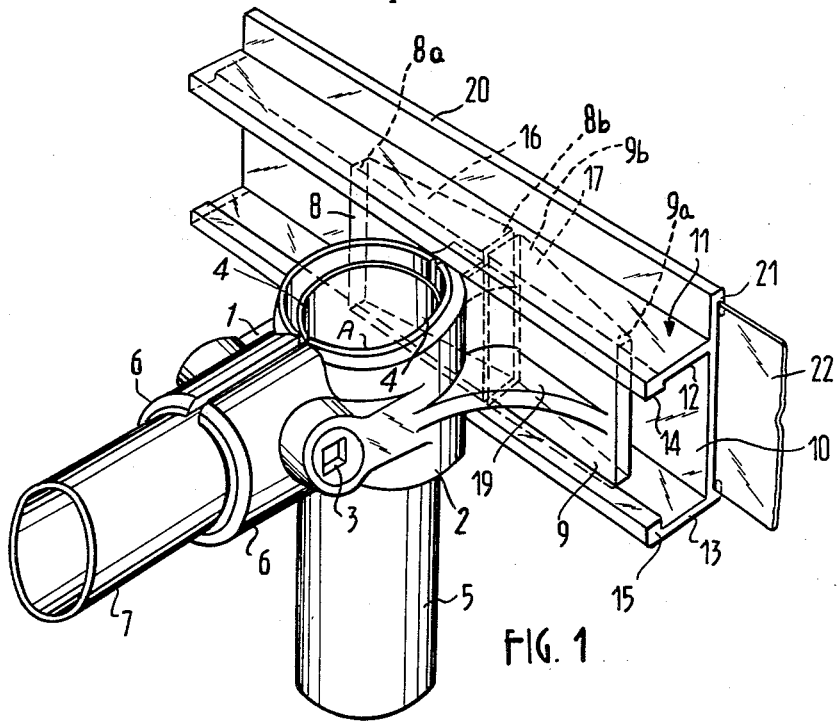
Fig. 1 is a perspective view of a joint according to the invention.
Figure 2:
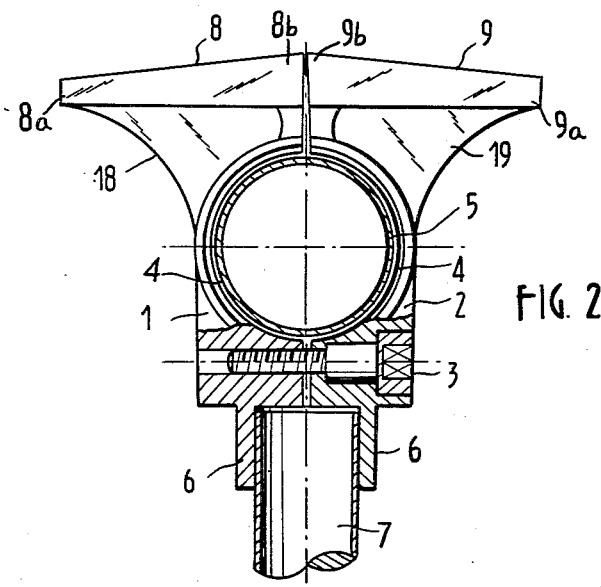
Fig. 2 is a cutout plain view of same joint.

Referring now to above figures, the joint is made-up by two elongated jaw members 1 and 2, connected to one another by means of the bolt 3. Each jaw member is formed intermediate its ends with a substantially semi-cylindrical recess 4 the axis of which is substantially normal to the jaw members. Actually, this recess is somewhat short of being a full semi-cylinder, so that when a tubular upright element 5 is located in the space formed by the recesses 4, the jaw members can be slightly pivoted around said upright. For this purpose means which engage the jaw members outwardly of the recesses thereof are provided, these means, in the illustrated embodiment, being the bolt 3 which passes freely through the jaw member 2 but which is in threaded engagement with the jaw member 1. If desired, the jaw members may be formed with semi-tubular rear portions 6 designed to tightly fasten a tubular cross bar 7, that serves both as horizontal support, and to connect the fore frame elements of shelves or pieces of furniture, with the rear frame elements thereof.

Each of the jaw members is formed at its front end with an elongated wedge-like acting clamping portion 8, 9 which extends substantially transverse to the length of the jaw members. These clamping portions are adapted to be received by a substantially channel-shaped member 11, the latter having a web 10 and a pair of opposite spaced legs 12 and 13 which are formed with inwardly directed flanges 14 and 15, respectively. The clamping portions 8, 9 are so shaped that when the jaw members 1 and 2 are pivoted about the axis of the cylindrical recesses 4, with the upright 5 acting as a fulcrum, in such a direction that the clamping portions are spread apart, the free ends 8a, 9a of the portion 8, 9 will be forced against the flanges 14, 15 while the inner ends 8b, 9b of the portions 8, 9 will be forced against the face of the web 10, thereby clamping the jaw members to the channel-shaped member 11. At the same time, a cross bar 7 or the like is located between the semi-tubular rear portions 6.

Obviously, the channel-shaped member 11 is designed in such a manner that the clamping portions 8, 9 inserted thereinto from either end, can be slid up to the point where the various components are to be joined together, and that could be in any position, either at an end of the channel-shaped member or at any intermediate location.

The upper edge of leg 12 could serve as a support for the planks, while the channel-shaped member itself, showing a shoulder 20 on its fore edge, could be provided with a guide 21, wherein an ornamental metal or plastic plate could be fitted.

It is to be understood that the invention is not limited to the exact details of construction shown and described, as variations and modifications and changes may be made therein as fall within the scope of the claims hereunto.

What I claim is:

1. A clamping arrangement comprising, in combination, a channel-shaped member having a web and a pair of opposite spaced legs extending transverse to said web, each of said legs having an inwardly directed flange; and a clamping device engaging said channel-shaped member, said clamping device being composed of a pair of elongated parallel jaw members extending transverse to said channel-shaped member, each of said jaw members being formed at that end thereof at which it engages said channel-shaped member with an elongated wedge-like acting clamping portion extending substantially transverse to the respective jaw member and therefore in the direction of said channel-shaped member, the clamping portions of said jaw members being so shaped that when they are spread apart each engages the inner face of said web as well as the inner faces of said flanges of said channel-shaped member, each of said jaw members being further formed in a region spaced from its clamping portion with a recess so shaped that when an element is placed into a space formed by the recesses of both jaw members the jaw members may be pivoted relative to each other about a pivot axis which passes through said space and which is substantially normal to said jaw members as well as to the planes of said legs of said channel-shaped member, said clamping device further including means engaging said jaw members outwardly of said recesses thereof for pivoting said jaw members about said axis, with the element placed in said space acting as a fulcrum, in such a direction that said clamping portions of said jaw members are spread apart, whereby said clamping portions are clamped to said channel-shaped member at any point along its length.

2. A clamping arrangement comprising, in combination, a channel-shaped member having a web and a pair of opposite spaced legs extending transverse to said web, each of said legs having an inwardly directed flange; and a clamping device engaging said channel-shaped member, said clamping device being composed of a pair of elongated parallel jaw members extending transverse to said channel-shaped member, each of said jaw members being formed at that end thereof at which it engages said channel-shaped member with an elongated wedge-like acting clamping portion extending substantially transverse to the respective jaw member and therefore in the direction of said channel-shaped member, the clamping portions of said jaw members being so shaped that when they are spread apart each engages the inner face of said web as well as the inner faces of said flanges of said channel-shaped member, each of said jaw members being further formed in a region spaced from its clamping portion with a semi-cylindrical recess the axis of which is substantially normal to said jaw members as well as to the planes of said legs of said channel-shaped member so that when a substantially cylindrical element is placed into the cylindrical space formed by the recesses of both jaw members the jaw members may be pivoted relative to each other about said axis, said clamping device further including means engaging said jaw members outwardly of said recesses thereof for pivoting said jaw members about said axis, with the substantially cylindrical element placed in said cylindrical space acting as a fulcrum, in such a direction that said clamping portions of said jaw members are spread apart, whereby said clamping portions are clamped to said channel-shaped member at any point along its length.

3. A clamping arrangement comprising, in combination, a channel-shaped member having a web and a pair of opposite spaced legs extending transverse to said web, each of said legs having an inwardly directed flange; and a clamping device engaging said channel-shaped member, said clamping device being composed of a pair of elongated parallel jaw members extending transverse to said channel-shaped member, each of said jaw members being formed at that end thereof at which it engages said channel-shaped member with an elongated wedge-like acting clamping portion extending substantially transverse to the respective jaw member and therefore in the direction of said channel-shaped member, the clamping portions of said jaw members being so shaped that when they are spread apart each engages the inner face of said web as well as the inner faces of said flanges of said channel-shaped member, each of said jaw members being further formed in the region intermediate its ends with a semi-circular recess the axis of which is substantially normal to said jaw members as well as to the planes of said legs of said channel-shaped member so that when a substantially cylindrical element is placed into the cylindrical space formed by the recesses of both jaw members the jaw members may be pivoted relative to each other about said axis, said clamping device further including means engaging said jaw members outwardly of said recesses thereof for bringing towards each other those ends of said jaw members which are opposite said clamping portions, whereby said jaw members may be pivoted relative to each, with the substantially cylindrical element placed in said cylindrical space acting as a fulcrum, in that direction in which said clamping portions are spread apart, thereby clamping said clamping portions to said channel-shaped member.

4. The combination defined in claim 3 wherein said means are screw means in threaded engagement with at least one of said jaw members.

References Cited in the file of this patent

UNITED STATES PATENTS

| 1,261,213 | Clay | Apr. 2, 1918 |
| 1,451,881 | McMullen | Apr. 17, 1923 |
| 1,739,009 | Lorber | Dec. 10, 1929 |
| 1,837,259 | Fitzpatrick | Dec. 22, 1931 |
| 2,546,242 | Stinson | Mar. 27, 1951 |
| 2,634,079 | Surenda | Apr. 7, 1954 |
| 2,711,566 | Peterson | June 28, 1955 |